(12) United States Patent
Wilson et al.

(10) Patent No.: US 8,046,568 B2
(45) Date of Patent: *Oct. 25, 2011

(54) MICROPROCESSOR WITH INTEGRATED HIGH SPEED MEMORY

(75) Inventors: Sophie Wilson, Cambridge (GB); John E. Redford, Cambridge (GB)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/824,947

(22) Filed: Jun. 28, 2010

(65) Prior Publication Data

US 2011/0040939 A1    Feb. 17, 2011

Related U.S. Application Data

(63) Continuation of application No. 10/857,979, filed on Jun. 2, 2004, now Pat. No. 7,747,843.

(51) Int. Cl.
*G06F 9/30* (2006.01)
(52) U.S. Cl. ......................................... 712/225; 712/24
(58) Field of Classification Search .................... 712/24, 712/225
See application file for complete search history.

(56) References Cited

U.S. PATENT DOCUMENTS

| | | |
|---|---|---|
| 4,791,550 A | 12/1988 | Stevenson et al. |
| 4,907,192 A | 3/1990 | Kaneko |
| 5,072,364 A | 12/1991 | Jardine et al. |
| 5,471,593 A | 11/1995 | Branigin |
| 5,761,706 A | 6/1998 | Kessler et al. |
| 5,793,661 A | 8/1998 | Dulong et al. |
| 5,887,183 A | 3/1999 | Agarwal et al. |
| 5,895,501 A | 4/1999 | Smith |
| 5,940,876 A | 8/1999 | Pickett |

(Continued)

OTHER PUBLICATIONS

"Introduction to ILP-Processors" and "VLIW Architectures," in *Advanced Computer Architectures: A Design Space Approach*, pp. 89-95 and 175-179, Sima, D., et al. (eds.), Addison Wesley Longman Limited, England (1997).

(Continued)

*Primary Examiner* — Alford W Kindred
*Assistant Examiner* — Benjamin P Geib
(74) *Attorney, Agent, or Firm* — Sterne, Kessler, Goldstein & Fox PLLC (57) ABSTRACT

The present invention relates to the field of (micro)computer design and architecture, and in particular to microarchitecture associated with moving data values between a (micro)processor and memory components. Particularly, the present invention relates to a computer system with an processor architecture in which register addresses are generated with more than one execution channel controlled by one central processing unit with at least one load/store unit for loading and storing data objects, and at least one cache memory associated to the processor holding data objects accessed by the processor, wherein said processor's load/store unit contains a high speed memory directly interfacing said load/store unit to the cache. The present invention improves the of architectures with dual ported microprocessor implementations comprising two execution pipelines capable of two load/store data transactions per cycle. By including a cache memory inside the load/store unit, the processor is directly interfaced from its load/store units to the caches. Thus, the present invention accelerates data accesses and transactions from and to the load/store units of the processor and the data cache memory.

18 Claims, 4 Drawing Sheets

U.S. PATENT DOCUMENTS

| | | |
|---|---|---|
| 5,996,069 A | 11/1999 | Yasoshima et al. |
| 6,237,079 B1 | 5/2001 | Stoney |
| 6,311,260 B1 | 10/2001 | Stone et al. |
| 6,530,012 B1 | 3/2003 | Wilson |
| 6,553,486 B1 | 4/2003 | Ansari |
| 6,571,318 B1 | 5/2003 | Sander et al. |
| 6,789,171 B2 | 9/2004 | Desai et al. |
| 6,918,031 B2 | 7/2005 | Wilson |
| 6,976,147 B1 | 12/2005 | Isaac et al. |
| 7,093,103 B2 | 8/2006 | Isomura |
| 7,174,434 B2 | 2/2007 | Blumrich et al. |
| 7,216,218 B2 | 5/2007 | Wilson |
| 7,346,763 B2 | 3/2008 | Wilson |
| 2003/0074530 A1 | 4/2003 | Mahalingaiah et al. |
| 2003/0074544 A1 | 4/2003 | Wilson |
| 2003/0159023 A1 | 8/2003 | Barlow et al. |
| 2004/0250090 A1 | 12/2004 | Crispin et al. |
| 2005/0198478 A1 | 9/2005 | Wilson |
| 2005/0273576 A1 | 12/2005 | Wilson |
| 2005/0273577 A1 | 12/2005 | Wilson et al. |
| 2005/0273582 A1 | 12/2005 | Wilson |
| 2007/0214319 A1 | 9/2007 | Wilson |

OTHER PUBLICATIONS

"Memory-Hierarchy Design" in *Computer Architecture: A Quantitative Approach*, 2nd Ed., pp. 416-422, Hennessy, J.L. and Patterson, D.A., Morgan Kaufmann Publishers, United States (Jan. 1996).

Non-Final Rejection mailed Jun. 26, 2006 for U.S. Appl. No. 10/857,843 filed Jun. 2, 2004, 17 pgs.

Notice of Allowance mailed Jan. 5, 2007 for U.S. Appl. No. 10/857,843 filed Jun. 2, 2004, 8 pgs.

Non-Final Rejection mailed May 5, 2006 for U.S. Appl. No. 10/857,964 filed Jun. 2, 2004, 18 pgs.

Final Rejection mailed Jan. 29, 2007 for U.S. Appl. No. 10/857,964 filed Jun. 2, 2004, 13 pgs.

Notice of Allowance mailed Oct. 23, 2007 for U.S. Appl. No. 10/857,964 filed Jun. 2, 2004, 7 pgs.

Non-Final Rejection mailed Dec. 10, 2007 for U.S. Appl. No. 11/797,754 filed May 7, 2007, 11 pgs.

Final Rejection mailed Dec. 8, 2008 for U.S. Appl. No. 11/797,754 filed May 7, 2007, 9 pgs.

MICROPROCESSOR WITH INTEGRATED HIGH SPEED MEMORY

CROSS-REFERENCE TO RELATED APPLICATIONS

The instant application is a continuation of U.S. patent application Ser. No. 10/857,979 titled "Microprocessor With Integrated High Speed Memory," filed Jun. 2, 2004, now allowed, which is incorporated by reference herein in its entirety.

FIELD OF THE INVENTION

The present invention relates to the field of (micro)computer design and architecture, and in particular to microarchitecture associated with moving data values between a (micro) processor and memory components. Particularly, the present invention relates to a computer system and to a method for operating said computer system with a processor architecture in which register addresses are generated with more than one execution channel controlled by one central processing unit.

BACKGROUND OF THE INVENTION

Known computer designs have a direct connection between the processor and its memory components. In conventional designs, data values are exchanged between the processor and the memory components containing load/store addresses and load/store data objects going in and out of the processor. In more sophisticated designs, in addition to the data values, instruction addresses and instruction data objects go out of the output side of the processor. With the improvement of the processor performance, and the enlargement of the memory components, the speed of data transfer between the processor, and the memory components constitutes a bottleneck of the system performance and therefore, a so called cache memory was introduced into the design in addition to the main memory. A cache is a small fast memory component holding data recently accessed by the processor, and designed to speed up subsequent access to the same data. A cache is most often applied to processor-memory access but also used for a local copy of data accessible over a network.

The cache may be located on the same integrated circuit as the processor, in order to shorten the transmission distance and thereby further reduce the access time. The cache is built from faster memory chips than a main memory so that a cache hit takes much less time to complete than a normal memory access. Processor microarchitecture in this area has been developed gradually and led to so called System on Chip designs, wherein the cache is on the same silicon die as the processor. In this case it is often known as primary cache since there may be a larger, slower secondary or third cache outside the CPU chip. As the processor's performance is getting faster, multiple levels of caching have been introduced, i.e. Level 1 being the closest to the processor, with Level 2 and sometimes Level 3 caches all on the same die. These different caches are usually of different sizes e.g. 16 kBytes for Level 1, 256 kByte for Level 2, 1 MByte for Level 3 so as to allow the smaller caches to run faster.

In computer systems it is conventional to define in each instruction to be executed a set of register addresses which are used to access a register file in the computer system. The register addresses usually include first and second register addresses defining registers from which operands are extracted and at least one destination register address defining a register into which the results of an operation are loaded. Data processing instructions generally use the contents of the first and second registers in some defined mathematical or logical manipulation and load the results of that manipulation into the defined destination register. Memory access instructions use the register addresses to define memory locations for loading and storing data to and from a data memory. In a load instruction, source registers define a memory location from which data is to be loaded into the destination register. In a store instruction, the source registers define a memory location into which data is to be stored from the destination register.

Existing computer systems generally operate by generating memory addresses for accessing memory sequentially. That is the architecture of existing computer systems is arranged such that each memory access instruction defines a single memory address. Memory access units exist which allow two addresses to be generated from a single instruction, by automatically incrementing the address defined in the instruction by a certain predetermined amount. However, these systems are clearly restricted in that, if two addresses are generated, the second address necessarily bears a certain predetermined relationship to the first address. Vector stride units also exist which allow more than one memory address to be computed, but these are also limited in the relationship between the addresses. Moreover, it is necessary to generate the first address prior to calculating the second address, and therefore it is not possible to generate two memory access addresses simultaneously in a single memory access unit. It is an object of the present invention to provide increased flexibility for memory accesses.

Some computer systems have more than one execution channel, e.g. dual ported computer systems with two execution channels. In such dual ported computer systems, each execution channel has a number of functional units which can operate independently, whereas both execution channels can be in use simultaneously. In some cases the execution channels share a common register file. It is useful in such architectures to provide instructions which simultaneously instruct both execution channels to implement a function so as to speed up operation of the processor. In such a scenario, a so-called long instruction may have two instruction portions each intended for a particular execution channel. Each instruction portion needs to define the register addresses for use in the function to be performed by the execution channel for which it is intended. In some cases both instruction portions may wish to define associated or the same register addresses. In these situations a long instruction needs to define two sets of register addresses, one for each execution channel.

Recently dual ported processors have been developed with specific designs comprising two execution pipelines and two load/store units (LSU) capable of two load/store data transactions per cycle (Broadcom "Firepath" processor) which will be described in more detail further below. In existing systems such dual ported processors have been connected directly to a psuedo dual ported on chip memory of a small size, e.g. 192-256 kbyte, to react fast enough. Since processors comprising two execution pipelines capable of two load/store data transactions per cycle run faster than conventional processors and the amount of required memory is increased, problems occur in implementing data caches to such processor designs.

One object of the present invention is to overcome the above mentioned problems and disadvantages by providing a processor architecture for dual ported processor implementations with two execution pipelines capable of two load/store data transactions per cycle and managing the data transactions between the processor and its cache memory. Another object of the present invention is to provide a suitable data cache memory device to be added to such dual ported processor implementations comprising two execution pipelines capable of two load/store data transactions per cycle.

SUMMARY OF THE INVENTION

The above objects, and others, are attained by a computer system comprising a processor with at least one load/store unit for loading and storing data objects, a decode unit for decoding instructions supplied to the decode unit from a program memory, wherein each instruction has at least one bit sequence defining a register address, a register file having a plurality of registers each having the same bit capacity and addressable via at least two register address ports, one of said ports being associated with a first execution channel of the computer system and the other of said ports being associated with a second execution channel of the computer system, a first register address supply path for supplying said at least one bit sequence to said one register address port, and at least one cache memory associated to the processor holding data objects accessed by the processor, said processor's load/store unit containing a high speed memory directly interfacing said load/store unit to the cache.

The present invention occurs as an improved fundamental part of all possible architectures with, by way of example, dual ported microprocessor implementations comprising two execution pipelines capable of two load/store data transactions per cycle which need to support data caches. The principle of the present invention resides in the fact that instead of dealing with two separate transactions in the cache design of the processor, the processor's own load/store units (LSU) are modified to include a small piece of high speed memory ("hotlines") which can be accessed much faster than an external transaction to the load/store units of the data cache, i.e. rather than load/store units.

In known computer architectures the processors only include read buffers or write buffers between the load/store unit and cache, and the processors of known computer architectures are not directly interfaced from their load/store units to the caches. In most conventional processors the read/write buffers are placed outside the cache. Traditionally, the write buffer is used to hold a line which is being evicted from a write-back data cache while the new data is being read (first) into that line. Access to an external data cache is such a time critical process that unwanted delays caused by external data cache accesses are to be avoided.

By including read buffers or write buffers inside the load/store unit according to the present invention, the processors are directly interfaced from their load/store units to the caches. Thus, the present invention provides a computer system which is able to manage the data transactions between the processor and its cache memory substantially faster than known devices and methods for managing the interaction between processors and their data cache. A processor architecture according to the present invention deals with the two transactions per cycle from two load/store units of dual ported processor designs without making the data cache any more complicated.

Furthermore, a processor architecture according to the present invention reduces the complexity of byte level half word, full word or long word addressability from the cache design. A computer system with an processor architecture according to the present invention thereby increases the bandwidth between the processor and the data cache. As to another advantageous aspect the computer system with an processor architecture according to the present invention causes data which has been prefetched for one execution pipeline of a dual ported processor to also be available for the other execution pipeline. The prefetch technique thereby minimises the time a processor spends waiting for instructions to be fetched from the memory. For this purpose, instructions following the one currently being executed are loaded into a prefetch queue when the processor's external bus is otherwise idle. Instruction prefetch is often combined with pipelining in an attempt to keep the pipeline busy.

DESCRIPTION OF THE PREFERRED EMBODIMENTS

Figure 1:
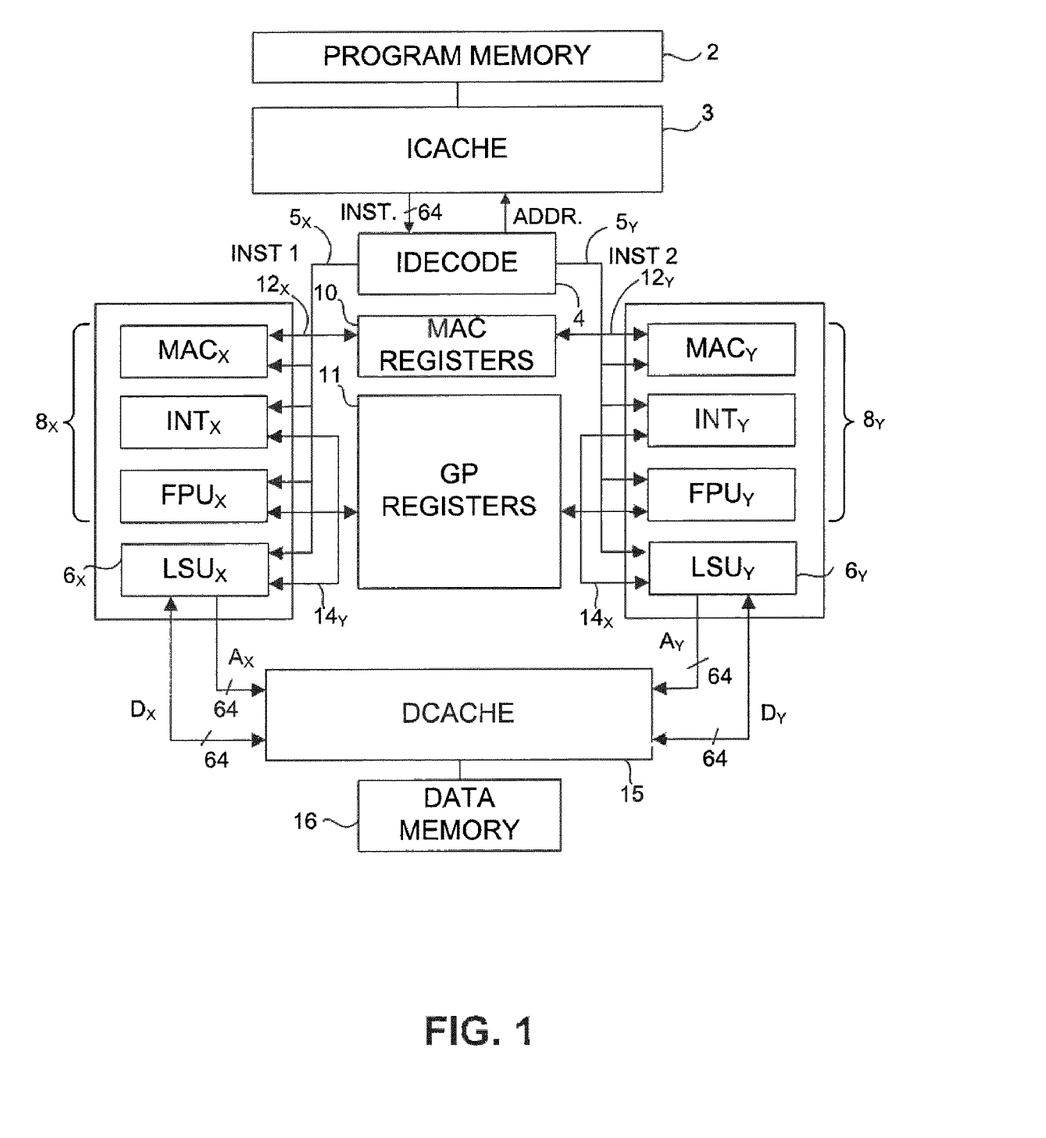
FIG. 1 is a schematic block diagram illustrating a dual ported processor.
Figure 2:
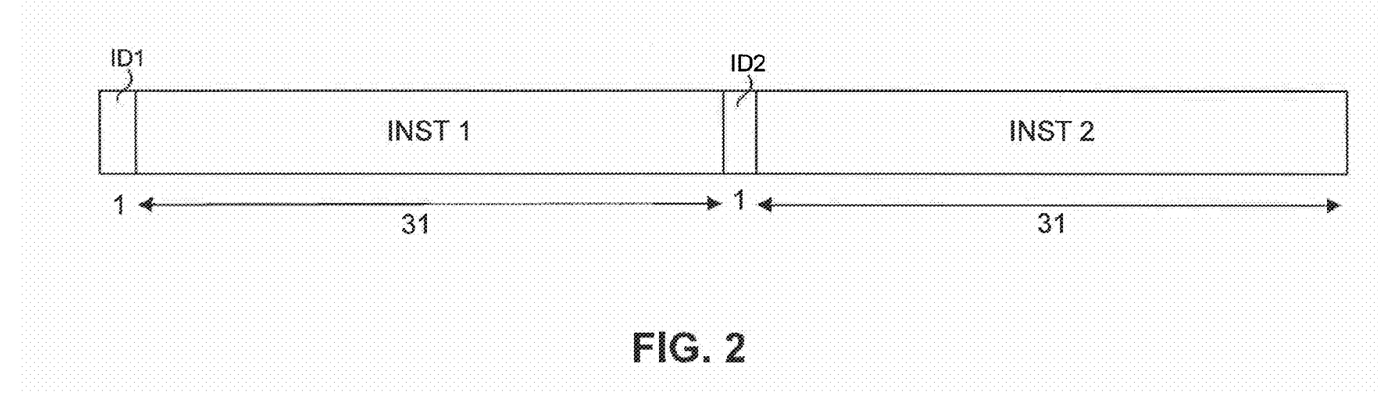
FIG. 2 is a diagram illustrating the encoding of two "packed" instructions.

Before describing a particular implementation of the present invention, first the principle function of a known register access system will be discussed. The preferred computer system described herein is a dual instruction stream, multiple data (DIMD) stream machine which normally executes two "instructions" every cycle. FIG. 1 is a schematic diagram of a system capable of performing the present invention. In FIG. 1, reference numeral 2 denotes a program memory which holds programs in the form of a plurality of instructions. In the normal mode of operation, each 64 bit instruction in the program memory allows two 31 bit operations to be defined in the manner illustrated in FIG. 2. That is, each 64 bit instruction contains two 31 bit instruction portions labelled INST1 and INST2. Each instruction portion has associated with it a single bit which identifies the type of instruction. These are denoted ID1 and ID2 in FIG. 2, standing for identification bits. An instruction portion can identify a data processing (DP) operation or a load/store (LD/ST) operation. The allowed combinations are two data processing operations (ID1,ID2 both set to "0"), two load/store operations (ID1,ID2 both set to "1") or one data processing and one load store operation (ID1=0, ID2=1).

In FIG. 1, the program memory 2 is connected as instruction cache 3 which is connected to instruction fetch/decode circuitry 4. The fetch/decode circuitry issues addresses to the program memory and receives 64 bit lines from the program memory 2 (or cache 3), evaluates the opcode and transmits the respective instructions INST1, INST2 along X and Y channels $5_X$, $5_Y$. Each channel comprises a SIMD (single instruction multiple data) execution unit $8_X$, $8_Y$ which includes three data processing units, MAC, INT and FPU and a load/store unit LSU 6. Each data processing unit MAC, INT and FPU and the load/store units LSU operate on a single instruction multiple data (SIMD) principle according to the SIMD lane expressed in the instruction according to the following protocol which defines the degree of packing of objects for packed data processing operations:

(B)-8 bit objects ($b_0 \ldots h_7$)
(H)-16 bit objects ($h_0 \ldots h_3$)
(W)-32 bit objects ($w_0 \ldots w_1$)
(L)-64 bit objects (I)
(S)-32 bit floating point
(D)-64 bit floating point For each channel $5_X$, $5_Y$ if the instruction is a data processing instruction it is supplied to the appropriate data processing unit MAC, INT or FPU and if it is a load/store instruction it is supplied to the load/store unit LSU. Data values are loaded to and from the MAC data processing units into and out of a common register file 10 which includes sixteen 64 bit special purpose registers along register access paths $12_X$, $12_Y$. Data values are loaded to and from the INT and FPU data processing units and the load/store units LSU into and out of a second register file 11 which includes sixty-four 64-bit general purpose registers. Register access paths $14_X$, $14_Y$ are provided for these accesses. The program counter PC which indicates the current instruction can be read via one of the general purpose registers. Another one of the general purpose registers constitutes a control and status register.

Each register access path 12, 14 carries three addresses from the accessing unit, two source addresses SRC1, SRC2 and a destination address DST. In the case of data processing instructions, the source addresses SRC1, SRC2 define registers in the register files 10, 11 which hold source operands for processing by the data processing unit. The destination address DST identifies a destination register into which a result of data processing will be placed. The operands and results are conveyed between the register file 10 or 11 and the respective data processing unit via the access paths 12, 14. In the case of load/store instructions, the instruction formats allow memory access addresses $A_X$, $A_Y$ to be formulated from data values held in the registers as described later. The load store units access a common address space in the form of a data memory 16 via a dual ported data cache DCACHE 15. For this purpose, each load/store unit has a 64 bit data bus $D_X$, $D_Y$ and a 64 bit address bus $A_X$, $A_Y$. Each load/store unit $6_X$, $6_Y$ can execute a number of different memory access (load/store) instructions.

According to a first class of memory access instructions, an object is loaded into a destination register specified in the instruction (in the DST field) from an address read from a source register in the instruction (in the BASE REG field). The length of the object depends on the SIMD lane B,H,W or L specified in the instruction opcode. If the object length is less than 64 bits, the upper bits of the destination register are filled with zeros. This class of instruction also allows the number of objects to be specified. The memory address is read from the source register in the register file 11 by the specified load/store unit $6_X$, $6_Y$ and despatched to the cache 15 via the appropriate address bus $A_X$, $A_Y$. The object or objects are returned along the data bus $D_X$ or $D_Y$ and loaded into the destination register of the register file 10 by the load/store unit.

For each of the load instructions in the first class, there are matching store instructions. In each case, a single address is sent by each load/store unit and a single data value is returned at that address. That data value can constitute a number of objects depending on the number specified in the instruction and the length specified in the SIMD lane of the instruction.

The processor described herein additionally provides a class of instructions which use packed offsets with a single base register in order to compute two (or more) addresses from a single instruction and therefore allow two (or more) data values to be retrieved from memory from one 32 bit instruction. The destination register (which serves as a source register for store operations) specifies an even/odd pair of registers for the memory access. By way of example, one instruction in this class, LDL2, will be described.

The load instruction LDL2 allows two long words to be loaded into successive destination registers $r_b$, $r_b+1$ from two independent addresses ADDR1,ADDR2 derived from a base address held in a register $r_a$ identified in the BASE REG field and two packed offsets w0,w1 held in a register $r_c$, identified in the INDX REG field. The LDL2 instruction thus allows two independent addresses to be generated. The INDX OP field allows the degree of packing (SIMD lane) in the index register $r_c$, to be defined.

It is now understood that the above described computer device is capable of running instructions on two identical pipelines in form of parallel instructions with the register fields modified, i.e. using special instructions which enable the device to co-execute instructions. Such parallel instruction is represented at assembly language level by the mnemonic with a 2 added, e.g. if LDL is load long, then LDL2 is load long dualled and loads two longs using two load store pipelines where the register addressing is modified on the second pipeline. This prior method, which this invention extends upon, designated a few special instructions (LDL2, STL2) which caused instructions co-executing with them to become dual executed instructions. Thereby, the possibility is provided for the programmer to explicitly specify said parallel operation without using more register space.

Figure 3:
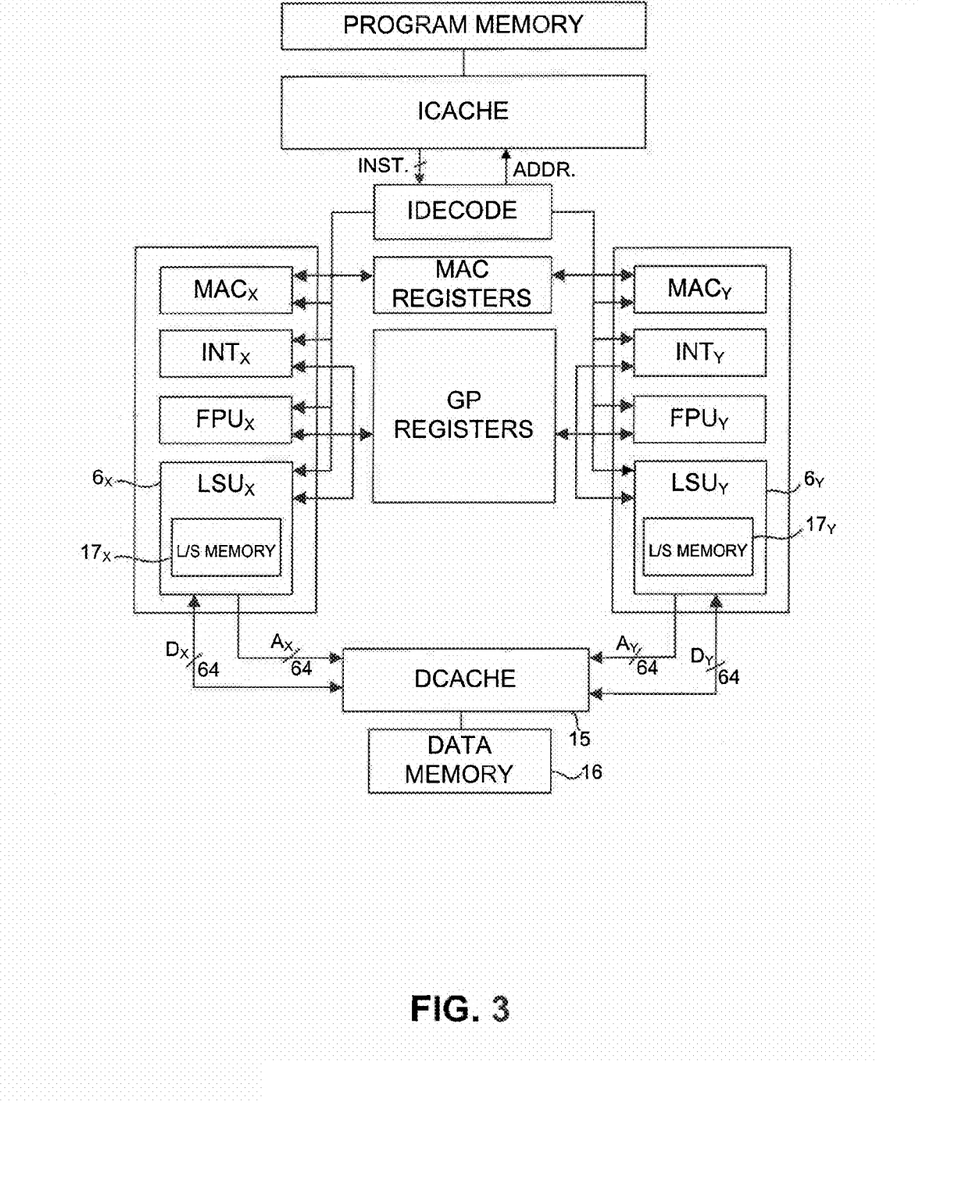
FIG. 3 illustrates the modification of the processor's load/store units to contain L/S memory, in accordance with an embodiment of the present invention.

In one variant, the present invention provides improved performance for dual ported microprocessor implementations comprising two execution pipelines as described above. FIG. 3 shows the modification of the processor's load/store units in accordance with the present invention to contain L/S Memory $17_X$, $17_Y$, a small piece of high speed memory ("hotlines") in the manner of a level 0 cache. This high speed memory accelerates data accesses and transactions. Such level 0 cache can be implemented by read buffers or write buffers included inside of the load/store unit of the processor, whereby the processor is directly interfaced from its load/store unit to the cache.

Figure 4:
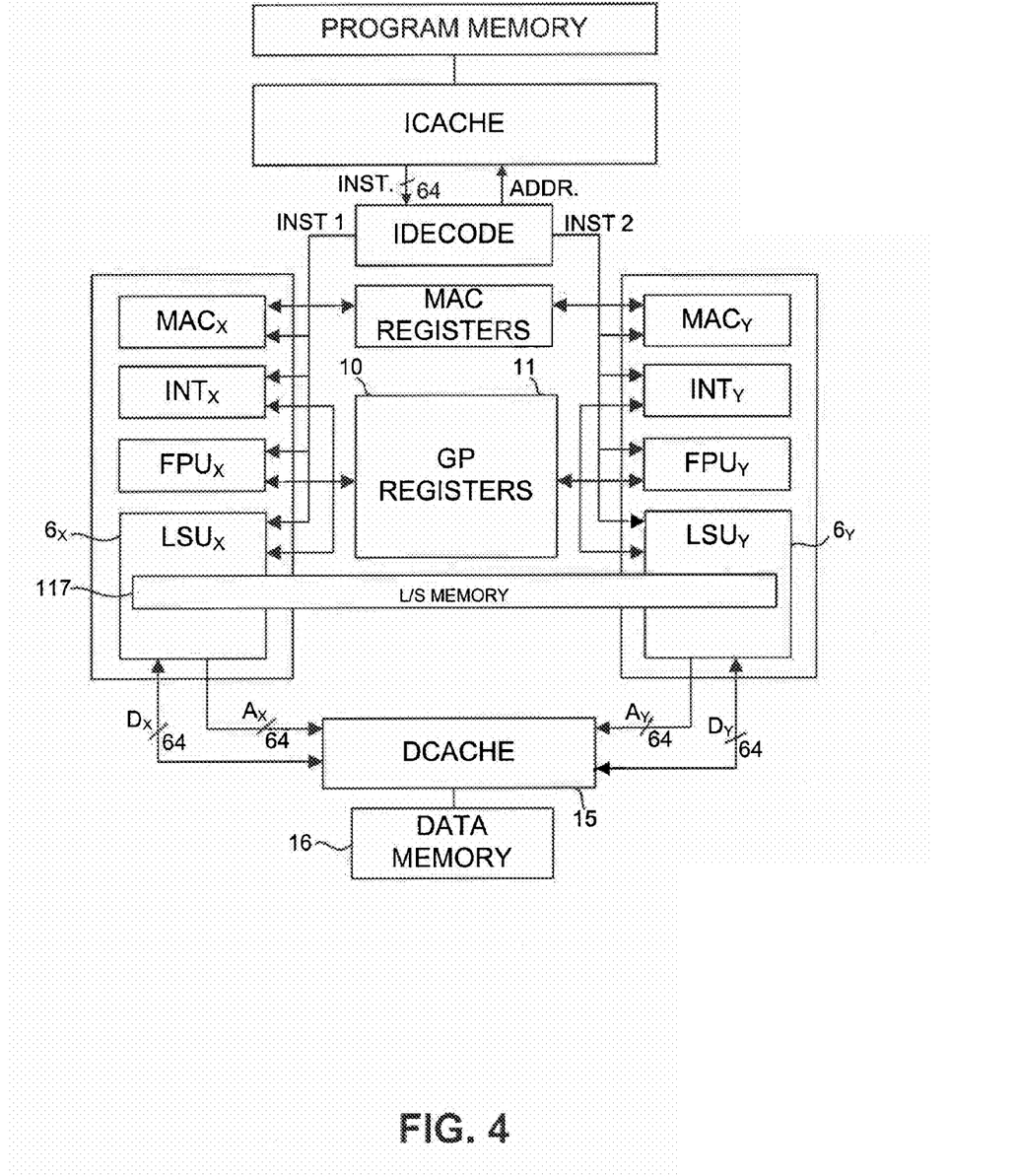
FIG. 4 illustrates an embodiment of a dual ported processor that includes load/store units having a shared load/store memory.

In an embodiment illustrated in FIG. 4, the dual ported processor's load/store units $6_X$ and $6_Y$ contain eight 256 bit lines of memory 117 in common between the two of them plus the address this memory refers to ("hotlines"). In another variant, the present invention provides a specific hotline for a data transfer between the dual ported processors' load/store units $6_X$ and $6_Y$ and the caches can be used to read or write simultaneously (true dual ported) by each load/store unit in just one phase of the respective load/store unit execution pipeline.

According to another variant of the present invention, a level 0 cache, which is a very small and very fast cache, is installed inside the processor and physically migrated inside of the processor's execution pipeline. In a preferred embodiment of the device according to the present invention a cache is arranged right inside the processor's load/store execution pipelines or the load/store unit itself. Such level 0 cache acts like hotlines with very high performance, since these are the lines the processor most frequently accesses in the level of data cache.

The hotlines according to the present invention also provide the implementation method for strided memory read and write operations—converting between a sequence of addresses in memory and a packed SIMD value in registers. Hence, the 8 values in order for an instruction like LDVB (load a strided vector of bytes) to work, storage for the data for each of the 8 bytes has to be provided in the 64 bit packed object that results. For instance, the instruction LDVB R0, requires the processor to generate the 8 byte address R1, R1+stride, R1+stride*2 . . . R1+stride*7 and fetch the data from there—or the aligned 256 bits which contains those addresses—and assemble a single SIMD value containing those 8 byte values. The hotline array can also be used to store the 8 intermediate values so that a subsequent instruction LDVB R0, operation where R1 has increased, e.g. by 1, will need to generate fewer—in case of many alignments of the data even none—data requests and so execute more quickly. Similarly, STVB will write the values into the hotlines, merging with what is already in the hotlines.

Usually caches are slow to access, since the processor needs to find out where in the cache the required data is stored. This is done by checking one or multiple tags to determine which way of the cache the data was stored. Preferably 8 addresses are compared simultaneously, not sequentially. In one variant, there's only one comparison time in total after which it can be determined which hotline matched the address. In case the hotline does not match with the address of the external cache has to be accessed again. Only one hotline will match for simple accesses like LDB, in this variant, but many may match for LDVB above. In case one hotline address does match with the address of the external cache, the values of said address are applied onto the read data bus of the computer system. With a level 0 cache migrated inside of the processor's execution pipeline according to the present invention an associative match can directly be done on the address by comparing eight addresses. After eight comparisons have been performed the required address is determined and the requested data can be retrieved from the registers with the respective address.

Furthermore, a processor architecture with a level 0 cache according to the invention supports all the processor's read misaligned activity without the necessity to be implemented in the data cache. In another preferred embodiment of the present invention, a processor architecture according to the invention also provides a simple single ported interface between the processor and the external level 1 data cache. This interface can widely be implemented in system on chip situations, e.g. 256 bits wide, to increase the data bandwidth between the processor and the data cache.

Conventionally, in a processor a load/store unit having several execution pipeline stages is provided. In this pipeline stages addresses are formed and caches are controlled. In processors comprising two execution pipelines and two load/store units, two addresses were formed in different load/store execution pipelines may be identical. If the same address has been formed in both execution pipelines, the processor is not really dual ported, and both execution pipelines would access the same block of memory. For avoiding data collision the accesses are sequentialized by sending an address out to the memory, waiting a cycle, retrieving the requested data and aligning the data.

Hence, with a level 0 cache arranged and migrated inside of the processor's execution pipeline according to the present invention the execution pipeline runs faster and the required address places can be retrieved more quickly. As a result, the required addresses are included in the load/store pipeline and thereby, the required addresses are immediately available for the processor omitting a necessity to check caches. Once a data access is formed a verification of an address match is performed.

In known dual ported computer systems it was not possible to perform two simultaneous random data accesses with addresses directed to the same block of the memory, respectively. Known dual ported computer systems can only do two simultaneous accesses in the case where the required addresses do not resolve in the same block of the memory. According to the present invention with a level 0 cache arranged and migrated inside of the processor's execution pipeline it is not necessary anymore to sequentialize memory accesses, since the level 0 cache structure is designed for a dual port reading, which makes it possible to perform two simultaneous random accesses with addresses directed to the same block inside the memory, respectively. Since a level 0 cache design according to the present invention is of such a small structure and of low complexity the additional costs for making it dual ported are irrelevant. In contrast to this, the costs of making an ordinary cache for a truly dual ported memory are much higher.

Still another benefit of the processor architecture according to the present invention with a level 0 cache migrated inside of the processor's execution pipeline a load/store execution pipeline is provided that it has an enhanced in/out interface to the outside of the processor, which can tolerate the outside environment being slower. Thereby, a natural wider interface to the processor and a higher bandwidth situation can be achieved.

What is claimed is:

1. A system comprising:
    a first execution channel configured to receive a first instruction portion, the first execution channel comprising:
        a first load/store unit directly coupled to a shared load/store memory, and
        a first processing unit coupled to the first load/store unit via a common register file having a plurality of registers;
    a second execution channel configured to receive a second instruction portion, the second execution channel comprising:
        a second load/store unit directly coupled to the shared load/store memory, and
        a second processing unit coupled to the second load/store unit via the common register file; and
    a data cache directly coupled to the first and second execution channels by an address bus and a data bus.

2. The system of claim 1, further comprising:
    a program memory configured to store a program including a plurality of instructions, wherein an instruction of the plurality of instructions comprises the first and second instruction portions.

3. The system of claim 2, further comprising:
    a decode unit configured to decode instructions from the program memory, transmit the first instruction portion to the first execution channel, and transmit the second instruction portion to the second execution channel.

4. The system of claim 2, wherein the plurality of instructions comprise an instruction for performing a strided memory operation.

5. The system of claim 4, wherein the shared load/store memory is used during the strided memory operation.

6. The system of claim 1, wherein the first and second instruction portions comprise an associated identification bit.

7. The system of claim 1, wherein the shared load/store memory comprises a read buffer and a write buffer.

8. The system of claim 1, wherein the shared load/store memory comprises a level 0 cache.

9. The system of claim 1, wherein the data cache comprises an interface to an external cache memory.

10. The system of claim 9, wherein the interface to the external cache memory is single ported and implemented in a system on chip.

11. The system of claim 1, wherein the first and second load/store units are configured to simultaneously compare at least two requested addresses of at least two data objects with two or more addresses held in the shared load/store memory.

12. The system of claim 11, wherein the first and second load/store units are configured to access the data cache when at least one of the at least two requested addresses does not match with at least one of the two or more address held in the shared load/store memory.

13. The system of claim 11, wherein the first and second load/store units are configured to retrieve the at least two data objects from the data cache.

14. The system of claim 11, wherein the first and second load/store units are configured to fetch at least one of the at least two requested addresses from the data cache.

15. The system of claim 11, wherein the first and second load/store units are configured to convert the at least two requested addresses from a sequence of addresses in the shared load/store memory to a packed SIMD value.

16. The system of claim 1, wherein the register file is addressable via a first register address port associated with the first execution channel and a second register address port associated with the second execution channel.

17. The system of claim 1, wherein the register file comprises a plurality of registers having a substantially similar bit capacity.

18. The system of claim 1, wherein the data cache comprises a plurality of ports with a common address space.

* * * * *